(12) United States Patent
Ragnet et al.

(10) Patent No.: US 9,654,632 B2
(45) Date of Patent: May 16, 2017

(54) APPARATUS AND METHOD FOR GENERATING A GRAPHICAL REPRESENTATION TO MOTIVATE EMPLOYEES IN A CALL CENTER

(71) Applicant: Xerox Corporation, Norwalk, CT (US)

(72) Inventors: Francois Ragnet, Venon (FR); Yves Hoppenot, Notre Dame de Message (FR); Benjamin Vincent Hanrahan, Grenoble (FR); Stefania Castellani, Meylan (FR); Frederic Somat, Apprieu (FR)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 14/617,396

(22) Filed: Feb. 9, 2015

(65) Prior Publication Data

US 2016/0234388 A1    Aug. 11, 2016

(51) Int. Cl.
*H04M 3/00* (2006.01)
*H04M 3/51* (2006.01)

(52) U.S. Cl.
CPC ...... *H04M 3/5175* (2013.01); *H04M 2201/38* (2013.01); *H04M 2203/401* (2013.01); *H04M 2203/405* (2013.01)

(58) Field of Classification Search
CPC .. H04M 3/5175; H04M 3/523; H04M 3/5183; H04M 2203/402; H04M 2203/401
USPC .......................... 379/265.01–265.04, 265.06
See application file for complete search history.

(56) References Cited

U.S. PATENT DOCUMENTS

| 2003/0081746 A1* | 5/2003 | Ahlstrom | H04M 11/025 379/102.06 |
| 2009/0138342 A1* | 5/2009 | Otto | G06Q 30/02 706/45 |

* cited by examiner

*Primary Examiner* — Rasha Al Aubaidi

(57) ABSTRACT

An apparatus, method and non-transitory computer readable medium for generating a graphical representation to motivate a plurality of employees in a call center are disclosed. For example, the apparatus includes a display comprising a plurality of pixels, wherein each one of the plurality of pixels represents one or more of the plurality of employees, a computer-readable medium storing the graphical representation and a processor in communication with the display and the computer-readable medium, wherein the processor receives an indication from an endpoint device of one of the plurality of employees when the one of the plurality of employees achieves a call center objective and the processor causes a pixel of the plurality of pixels associated with the one of the plurality of employees to turn on in accordance with the graphical representation, wherein the graphical representation comprises a pixel art shape.

19 Claims, 7 Drawing Sheets

APPARATUS AND METHOD FOR GENERATING A GRAPHICAL REPRESENTATION TO MOTIVATE EMPLOYEES IN A CALL CENTER

The present disclosure relates generally to improving productivity and efficiency in call centers and, more particularly, to an apparatus and method for generating a graphical representation to motivate employees in a call center.

BACKGROUND

Call centers and service centers are under an extremely high pressure and need to keep very high performance in a very stressful environment. High client satisfaction and Quality of Service are becoming key differentiators in a commoditized market. Agents need to be kept highly engaged and are given little feedback on their current performance, a combination which negatively impacts their morale.

Lack of engagement of the agents can impact call center performance in multiple ways. For example, service quality and motivation to efficiently handle calls can be negatively affected. Also attrition in call centers is extremely high, often over 100% per year, often leaving a large portion of agents under-skilled and partially disengaged from their day-to-day job. Furthermore, each new hire must go through an extensive training period.

SUMMARY

According to aspects illustrated herein, there are provided an apparatus, a method and a non-transitory computer readable medium for generating a graphical representation to motivate a plurality of employees in a call center. One disclosed feature of the embodiments is an apparatus comprising a display comprising a plurality of pixels, wherein each one of the plurality of pixels represents one or more of the plurality of employees, a computer-readable medium storing the graphical representation and a processor in communication with the display and the computer-readable medium, wherein the processor receives an indication from an endpoint device of one of the plurality of employees when the one of the plurality of employees achieves a call center objective and the processor causes a pixel of the plurality of pixels associated with the one of the plurality of employees to turn on in accordance with the graphical representation, wherein the graphical representation comprises a pixel art shape.

Another disclosed feature of the embodiments is a method for generating a graphical representation to motivate a plurality of employees in a call center comprising receiving an indication from an endpoint device of one of the plurality of employees when one of the plurality of employees achieves a call center objective, instructing a display to turn on a pixel of a plurality of pixels associated with the one of the plurality of employees in accordance with the graphical representation, wherein the graphical representation comprises a pixel art shape, wherein each one of the plurality of pixels represents one or more of the plurality of employees and repeating the receiving and the instructing until the graphical representation is completed.

Another disclosed feature of the embodiments is a non-transitory computer-readable medium having stored thereon a plurality of instructions, the plurality of instructions including instructions, which when executed by a processor, cause the processor to perform operations comprising receiving an indication from an endpoint device of one of the plurality of employees when one of the plurality of employees achieves a call center objective, instructing a display to turn on a pixel of a plurality of pixels associated with the one of the plurality of employees in accordance with the graphical representation, wherein each one of the plurality of pixels represents one or more of the plurality of employees and repeating the receiving and the instructing until the graphical representation is completed.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for generating a graphical representation to motivate a plurality of employees in a call center. As discussed above, call centers and service centers are under an extremely high pressure and need to keep very high performance in a very stressful environment. High client satisfaction and Quality of Service are becoming key differentiators in a commoditized market. Agents need to be kept highly engaged and are given little feedback on their current performance, a combination which negatively impacts their morale.

Embodiments of the present disclosure provide a novel method for providing call agents of a call center with motivation to meet call center objectives by generating a graphical representation based on the call agents meeting call center objectives. For example, pixels on a display may be randomly assigned to each call agent or employee. Each time a call agent meets a call center objective, the pixel that is associated with the employee may be turned on. As each additional agent meets his or her call center objective, the remaining pixels may be lit on the display to illustrate a pixel art.

In another embodiment, the agents may be divided into teams and the teams may compete against one another via the graphical representation. For example, the graphical representation may be a race to see who completes the pixel art first on the display, a race to reach a common goal line using a dot wall, a strategic game, and the like. As a result, the call agents are motivated to work together to complete the graphical representation or win the competition represented by the graphical representation on the display of pixels.

Figure 1:
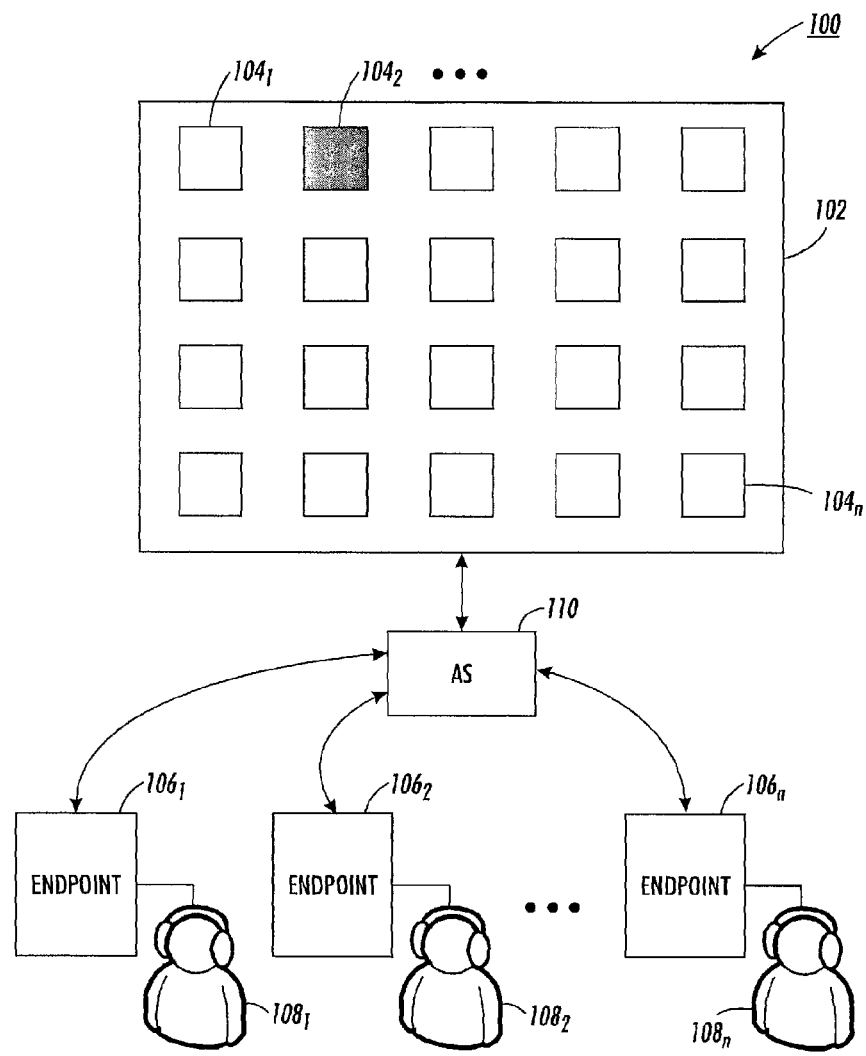
FIG. 1 illustrates one embodiment of a block diagram of a system of the present disclosure.

FIG. 1 illustrates an example system 100 of the present disclosure. In one embodiment, the system 100 includes a display 102. The display 102 comprises a large screen, visual display or monitor that may be located in a call center or a service center where one or more agents $108_1$ to $108_n$ (also referred to herein collectively as agents 108 or individually as an agent 108) may view the display 102. In one embodiment, the display 102 may include a plurality of pixels $104_1$ to $104_n$ (also referred to herein collectively as pixels 104 or individually as pixel 104). In one embodiment, each pixel 104 may be a single light source on the display 102 (e.g., a single LED light or a single light bulb). In another embodiment each pixel 104 may be a cluster of light sources that generates a square or rectangular pixel shape.

In one embodiment, each one of the agents 108 may have an associated endpoint device $106_1$ to $106_n$ (also referred to herein collectively as endpoint devices 106 or individually as endpoint device 106). In one embodiment, the endpoint devices 106 may be a desktop computer, a laptop computer, a tablet computer, and the like.

In one embodiment, the endpoint devices 106 may be used to enable each one of the agents 108 to receive and make calls for customer service. In addition, the endpoint devices 106 may track a performance of each respective agent 108 and determine whether the respective agent 108 is meeting a call center objective. In one embodiment, the call center objective may include a number of positive customer ratings above a ratings threshold, a number of calls completed above a call completion threshold, meeting a target for a Key Performance Indicator, an average call handling time per call, and the like.

In one embodiment, each one of the pixels 104 of the display 102 may be associated with one or more agents 108. In one embodiment, each agent 108 may be assigned to or associated with a pixel 104 of the display 102. In other words, if the number of pixels 104 matches the number of agents 108, there may be a one to one correspondence between pixels 104 and agents 108 and each pixel 104 may be assigned to different agents 108.

In another embodiment, if the number of pixels 104 and the number of agents 108 do not match, one or more groups of agents 108 may be assigned to each pixel 104. For example, if there are 16 pixels 104 and 32 agents 108, then two agents 108 may be assigned to each pixel 104.

In one embodiment, the agents 108 may be assigned to each pixel 104 at random. As a result, the agents 108 do not know which pixel 104 they are assigned to in the display 102. As a result, during the generation of the graphical representation (discussed below) on the display 102, each agent 108 will remain anonymous. In other words, if an agent 108 fails to contribute to the generation of the graphical representation on the display 102, the identity of the agent 108 will be unknown to the other agents 108 in the call center or service center. The anonymity of the agents 108 helps to promote participation and motivation of the agents 108 without fear of humiliation or being singled out by other agents 108 for failing to contribute to the graphical representation.

In one embodiment, each time an agent 108 meets a call center objective, the respective endpoint device 106 may send an indication to an application server (AS) 110. The AS 110 may include a computer readable medium, memory or a database that stores a graphical representation and a table that lists which agent or agents 108 is assigned to which pixel 104 in the display 102 for a particular instance of the graphical representation. In other words, the assignment of an agent 108 to a particular pixel 104 may change with each new graphical representation. Based on the pixel 104 that is assigned to the agent 108 that met the call center objective, the AS 110 may communicate with the display 102 and cause the corresponding pixel to turn on.

For example, in FIG. 1, if the agent $108_2$ meets the call center objective, the respective endpoint device $106_2$ may send an indication to the AS 110. The AS 110 may determine that the graphical representation is pixel art for the current shift of agents 108 and that the agent $108_2$ is assigned to pixel $104_2$ and cause the display 102 to turn on the pixel $104_2$ as illustrated by the darkened pixel in FIG. 1. This process may be repeated for each remaining agent 108 until the graphical representation is completed on the display 102.

In one embodiment, the pixels 104 may be displayed in different colors. For example, the pixel 104 may have a red color, an orange color and a green color. In one embodiment, each color may be associated with a different performance level of a corresponding agent 108 and be used for different graphical representations (discussed below). In one embodiment, a red color may indicate that an agent is performing below a performance range, an orange color may indicate that the agent is performing within the performance range, and the green color may indicate that the agent is performing above the performance range. For example, the performance range may be average customer satisfaction rating and the range may be 3 to 8 on a scale of 1 to 10. Thus, an agent 108 that has an average customer satisfaction rating of 2 would receive a red color for his or her pixel 104.

In another embodiment, the red color may indicate that an agent is performing above a performance range, an orange color may indicate that the agent is performing within the performance range and the green color may indicate that the agent is performing below the performance range. For example, the performance range may be an average call handling time between 5 minutes and 1 minute. Thus, if the agent 108 has an average call handling time of 30 seconds, which is below 1 minute, the agent 108 would receive a green color for his or her pixel 104.

Thus, when different colors are used, the indication sent by a respective endpoint device 106 may also include a performance of the agent 108. The AS 110 may determine what color should be turned on for the pixel 104 associated with the performance of the agent 108 received from the respective endpoint device 106. The AS 110 may then communicate with the display 102 to cause the display 102 to turn on the pixel 104 that corresponds with the agent 108 with the appropriate color based on the performance of the agent 108.

In one embodiment, the graphical representation may be a variety of different "games" or competitions to help motivate the agents 108. For example, the graphical representation may be a pixel art or picture that is formed by random illumination of each pixel 104 as each agent 108 meets his or her call center objective and has an associated pixel 104 turn on. The agents 108 may be motivated to figure out what the pixel art is and strive to meet his or her call center objective to contribute to the completion of the pixel art. In another embodiment, the graphical representation may be a competition between two different teams of agents 108. For example, the competition may be to complete a respective pixel art first before the other team or a race represented by a growing dot wall. FIGS. 2-5 illustrate different examples of the graphical representations that can be used in embodiments of the present disclosure.

Figure 2:
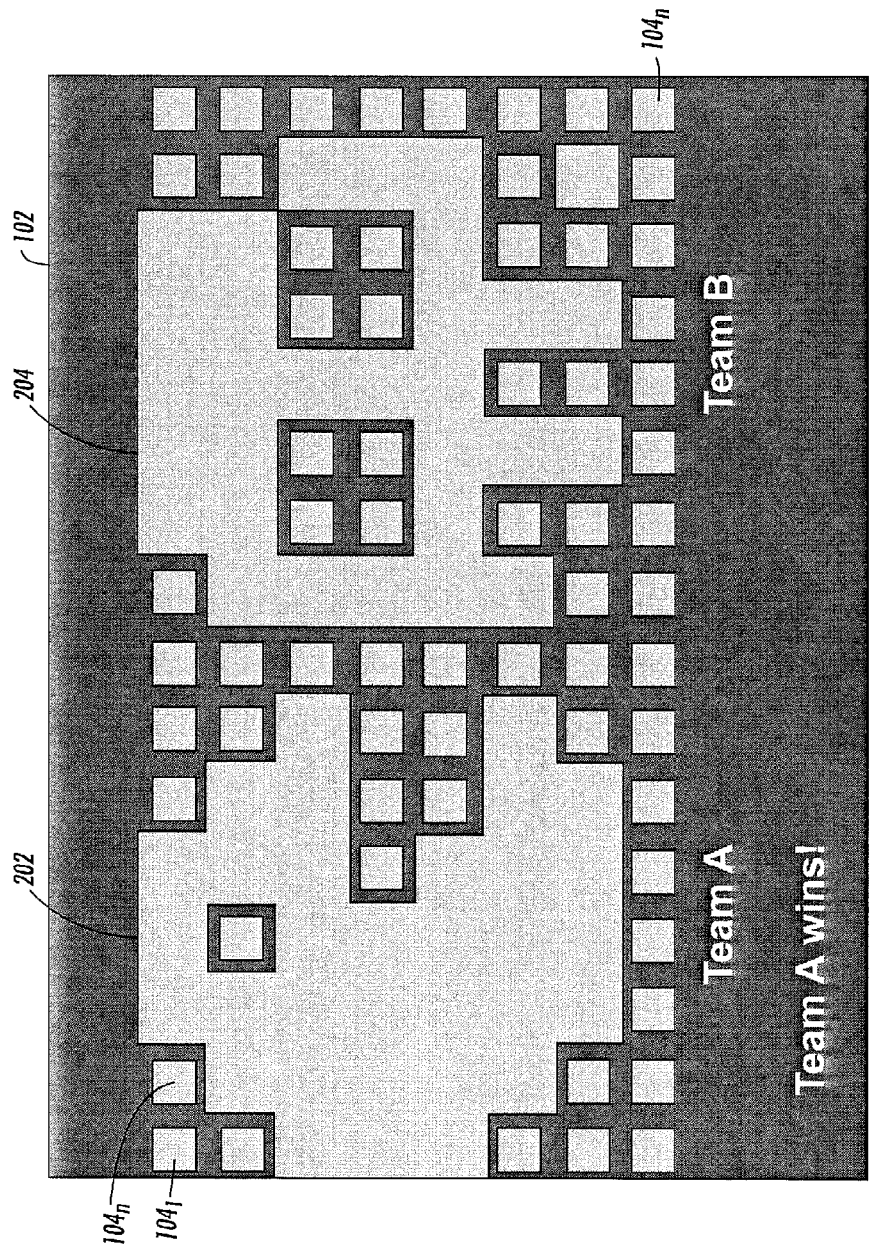
FIG. 2 illustrates one embodiment of a graphical representation.

FIG. 2 illustrates an example of the display 102 and the pixels 104. The pixels 104 may be turned on to illustrate a pixel art 202. In one embodiment, all of the agents 108 may be on the same team and try to complete the pixel art 202. In one embodiment, the agents may compete against a timer. For example, the agents 108 may have 8 hours (e.g., a shift) to meet the call center objective and complete the pixel art 202. In one embodiment, the pixel art 202 may be a different image for each iteration of the graphical representation or different for each shift.

In one embodiment, agents 108 may participate in a game to be the first one to guess the pixel art 202 that is slowly being displayed as each pixel 104 is turned on. For example, each one of the endpoint devices 106 may be in communication with the AS 110. When an agent or agent 108 believes that he or she knows what the pixel art 202 is, the agent or agents 108 may submit a response via his or her respective endpoint device 106. The AS 110 may determine which agent 108 submitted the first correct response and that agent 108 may be determined to be the winner. The AS 110 may select a new or different pixel art for the graphical representation, the agents 108 may be reassigned to different pixels 104 and the game may be repeated with all the pixels 104 on the display 102 turned off.

In one embodiment, the agents 108 may be divided into two separate teams (e.g., team A and team B). The display may be divided logically into two or more separate sections to generate the graphical representation over time as each pixel is turned on for each team. For example, the teams may compete to complete their respective pixel art 202 or 204 first. In one embodiment, the pixel arts 202 and 204 may be animated to show the respective pixel art of the respective team that wins, i.e., "defeating" the respective pixel art of the respective team that loses. For example, "defeating" may be animated as one pixel art "eating" the other pixel art, one pixel art "slaying" the other pixel art, one pixel art knocking down the other pixel art, and the like. For example, if team A completes the pixel art 202 of a Pac-Man® character first, then pixel art 202 may be animated showing the pixel art 202 "eating" the ghost represented by the pixel art 204.

Figure 3:
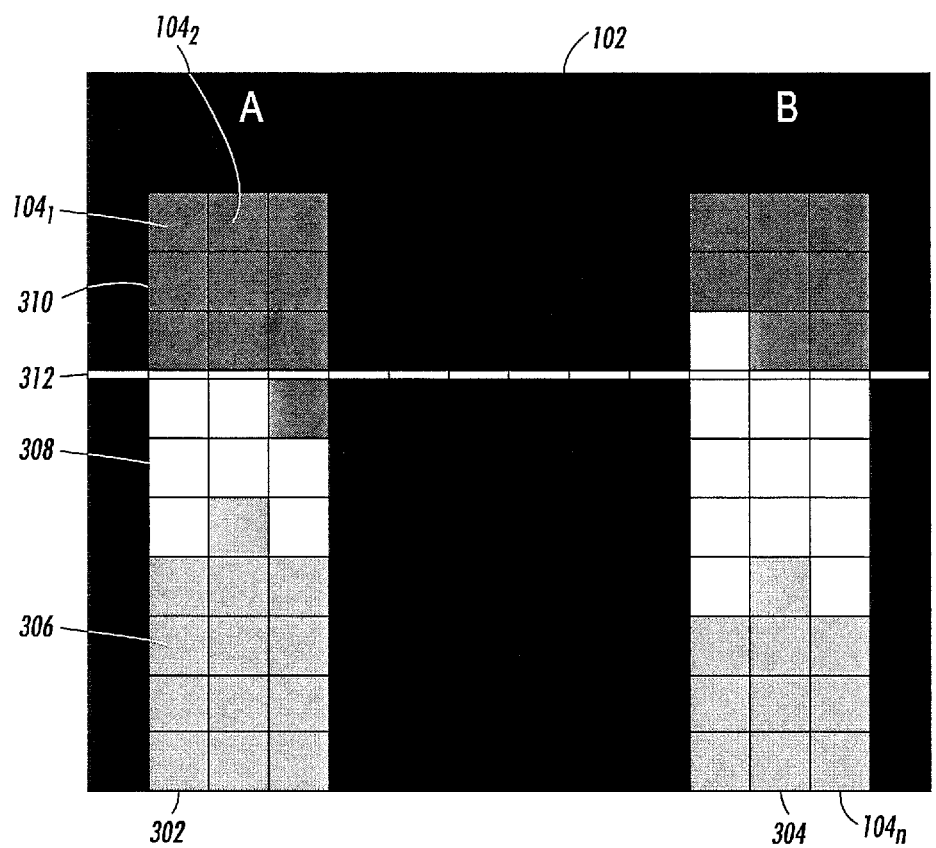
FIG. 3 illustrates another embodiment of a graphical representation.

FIG. 3 illustrates an example of the display 102 and the pixels 104. In one embodiment, the agents 108 may be on a same time and try to build a dot wall 302 to exceed an overall call center objective represented by a line 312. In one embodiment, the overall call center objective may be a compilation of each individual call center objective. For example, the overall call center objective may be having a number of positive customer ratings above a ratings threshold for the entire call center or service center, a number of calls completed above a call completion threshold for the entire call center or service center, or meeting an overall call center or service center target for a Key Performance Indicator. In other words, the overall call center objective threshold may be a higher value than the call center objective for each individual.

In one embodiment, the dot wall 302 may use different colored pixels as discussed above. For example, pixels 306 may be green, pixels 308 may be orange and pixels 310 may be red. In one embodiment, the object of the graphical representation using the dot wall 302 may be to grow the dot wall 302 such that the green pixels 306 exceed the line 312 representing the overall call center objective.

In another embodiment, the agents 108 may be divided into two teams; team A and team B, and race against one another in building each team's respective dot wall 302 and 304 past the line 312 first. In other words, the graphical representation may be a competition between two teams to build each team's respective dot wall 302 and 304 the quickest with the green pixels 306 past the line 312. In the embodiment illustrated in FIG. 3, the dot wall race may be grown vertically towards the line 312.

In one embodiment, the dot wall 302 and 304 may be dynamic. In other words, the performance of the agents 108 may be dynamic with respect to the performance range. For example, over a course of a shift, the agent's performance may change from being above the performance range to within the performance range, then back above the performance range. As a result, the pixel 104 associated with the agent 108 may change from green to orange and back to green over the course of his or her shift. In addition, the green pixels 306 of the dot wall may rise and fall, towards and away from the line 312, in accordance with the dynamic changing of the color of the pixel 104 associated with the agent 108.

Figure 4:
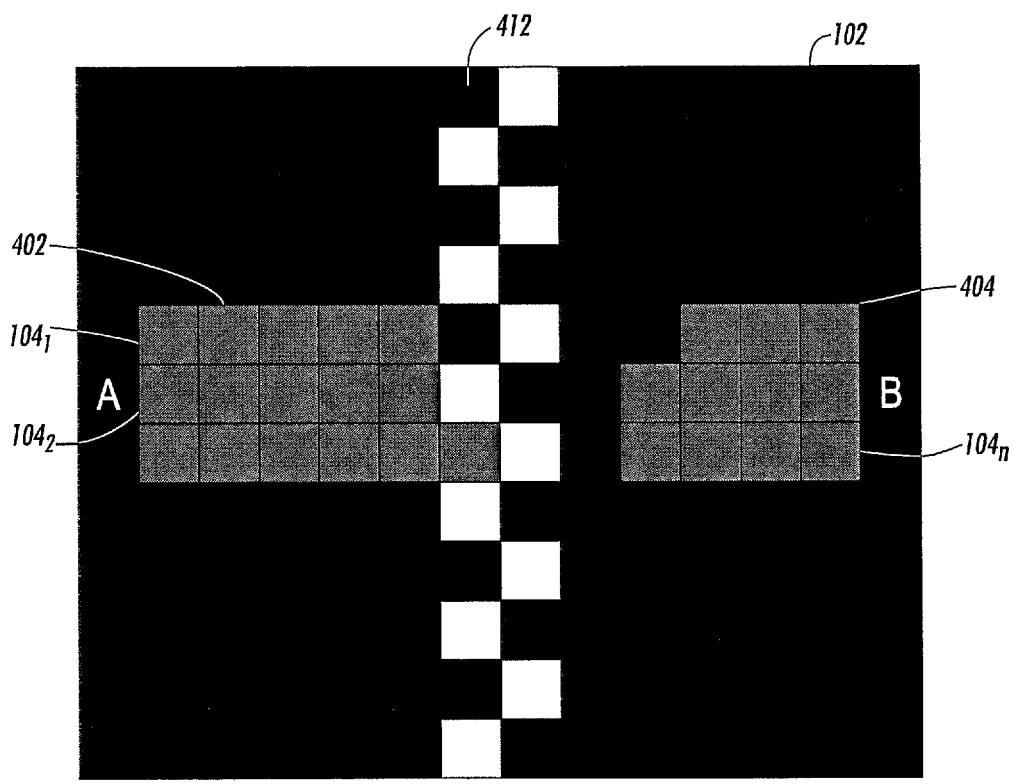
FIG. 4 illustrates yet another embodiment of a graphical representation.

In another embodiment illustrated in FIG. 4, the dot wall race may be similar to the dot wall race illustrated in FIG. 3, but grown in parallel or opposed to one another towards a line 412 that runs vertically between the two teams. In other words, the line 412 may also represent an overall call center objective and the object may be for each team of agents 108 to grow a respective dot wall 402 or 404 towards the line 412 and be the first team to reach the line 412.

Similar to the dynamically changing dot walls 302 and 304 discussed above with respect to FIG. 3, the dot walls 402 and 404 may also dynamically change. For example, if an agent's performance falls below the call center objective over a course of a pre-defined time period (e.g., a shift) the pixel may be turned on or off or the color may be changed, if different colors are used, according to the performance of the agent.

Figure 5:
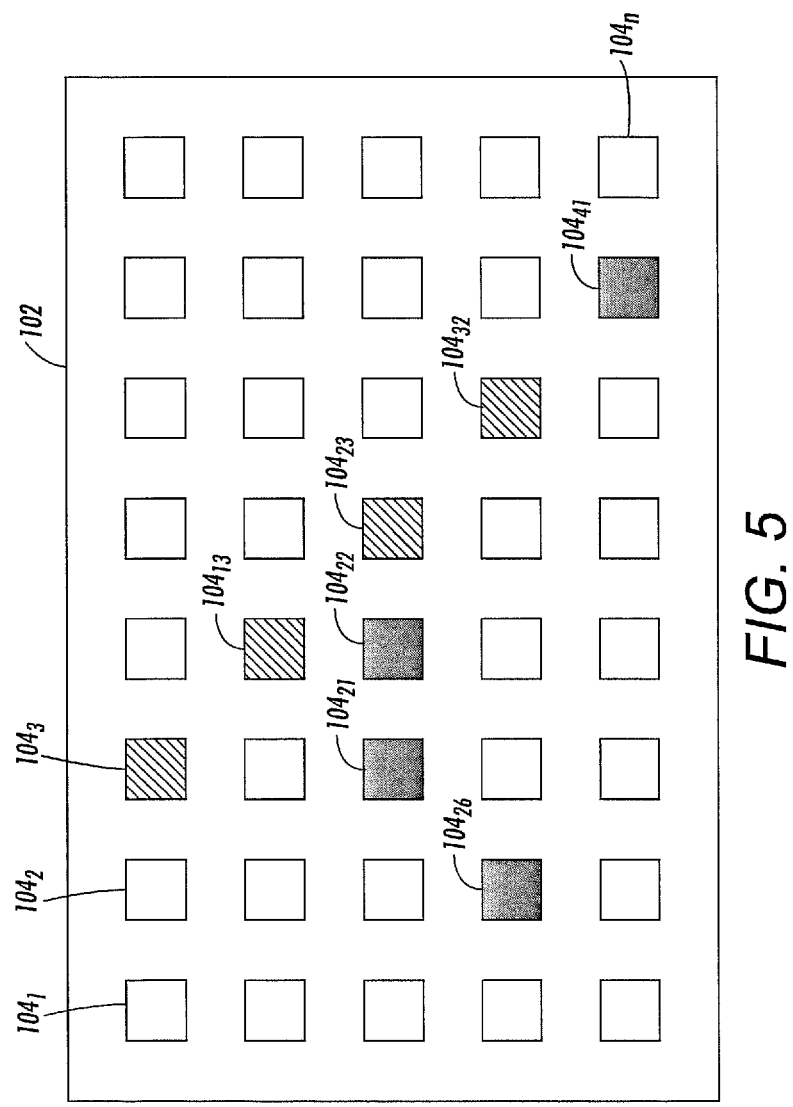
FIG. 5 illustrates yet another embodiment of a graphical representation.

FIG. 5 illustrates an example of the display 102 and the pixels 104. In one embodiment, the agents 108 may be divided into teams and the graphical representation may be a strategic game using the pixel art shapes on the display 102. For example, the strategic game may be a connect four game using the pixel art shapes of circles, a wall break game using the pixel art shapes as the paddle, ball and wall, a Tetris® game using the pixel art shapes of the various shapes used in the Tetris® game, and the like. FIG. 5 illustrates an example of a connect four game where each team may have a different colored pixel 104. For example, a first team may have pixels 104 with a first color (e.g., red) represented by pixels $104_3$, $104_{13}$, $104_{23}$ and $104_{32}$ and a second team may have pixels 104 with a second color (e.g., green) represented by pixels $104_{21}$, $104_{22}$, $104_{26}$ and $104_{41}$. In one embodiment, each time an agent 108 on a respective team meets a call center objective, the agent 108 may select a pixel 104 on the display 102 to turn on by sending a signal from his or her endpoint device 106 to the AS 110. The AS 110 may then communicate with the display 102 to cause the selected pixel 104 to turn on. Each agent 108 on each team may take turns as he or she meets a respective call center objective until a team "connects four" (e.g., pixels $104_3$, $104_{13}$, $104_{23}$ and $104_{32}$).

It should be noted that the examples illustrated in FIGS. 2-5 are intended to be examples and should not be limiting. It should be noted that other graphical representations not illustrated may be used and be within the scope of the present disclosure.

Figure 6:
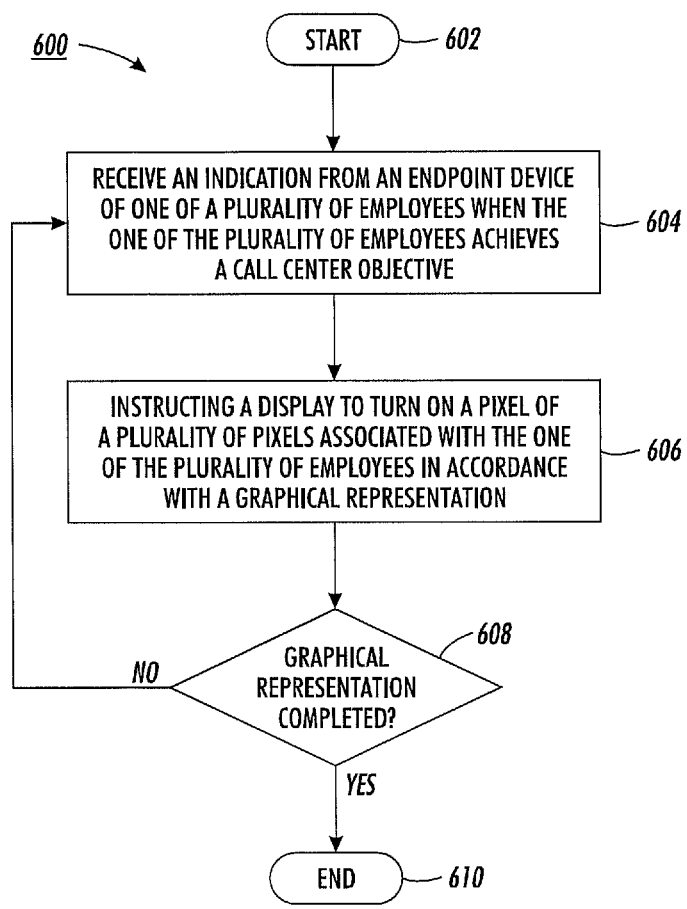
FIG. 6 illustrates a flowchart of one embodiment of a method for generating a graphical representation to motivate a plurality of employees in a call center.
Figure 7:
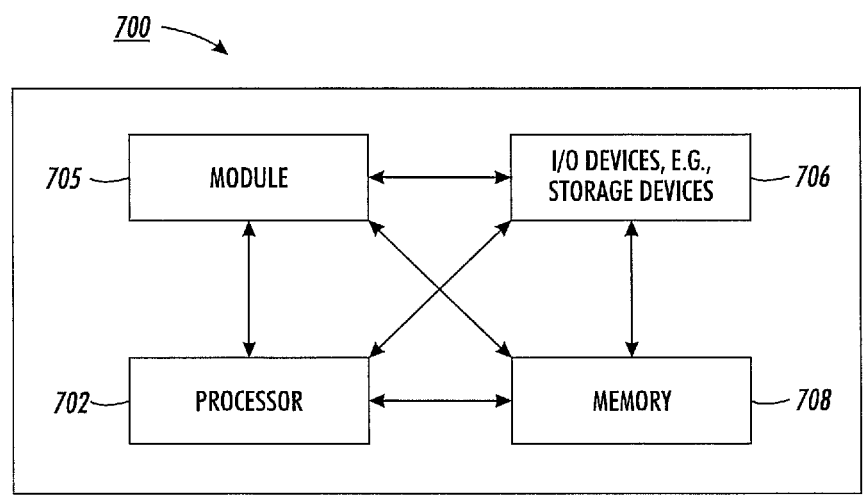
FIG. 7 illustrates a high-level block diagram of a computer suitable for use in performing the functions described herein.

FIG. 6 illustrates a flowchart of a method 600 for generating a graphical representation to motivate a plurality of employees in a call center. In one embodiment, one or more steps or operations of the method 600 may be performed by the AS 110 or a computer as illustrated in FIG. 7 and discussed below.

At step 602 the method 600 begins. At step 604, the method 600 receives an indication from an endpoint device of one of a plurality of employees when the one of the plurality of employees achieves a call center objective. For example, when an agent achieves a call center objective such as, a number of positive customer ratings above a ratings threshold, a number of calls completed above a call completion threshold, meeting a target for a Key Performance Indicator, an average call handling time per call, and the like, an endpoint device of the agent may send an indication that the call center objective was met.

In one embodiment, the indication may also include a performance of the agent. The performance may be related to whatever call center objective is being monitored. The performance may be used by the AS 110 to determine what color to use to turn on a pixel associated with the agent if different colors are being used for the graphical representation. In other words, the AS 110 may determine a color of a pixel to be turned on based on the performance. As discussed above, the color may be a green color indicating that the performance is above a performance range, an orange color indicating the performance is within the performance range or a red color indicating the performance is below the performance range. Although the colors of green, orange and red are used, it should be noted that any color combination may be used to indicate different varying levels of performance.

At step 606, the method 600 instructs a display to turn on a pixel of a plurality of pixels associated with the one of the plurality of employees in accordance with a graphical representation, wherein the graphical representation comprises a pixel art shape. For example, the AS 110 may have a computer readable medium or memory or be in communication with a database that stores one or more different graphical representations. One of the graphical representations may be used for the agents for a particular time period, working event, shift change, etc. The computer readable medium, memory or database may also store a table that lists which agent or agents are assigned to which pixels of a display. Based on the table and the graphical representation that is being used, the AS 110 may communicate with the display and cause an appropriate pixel to turn on. In other words, the pixel that is assigned to the agent that sent the indication for meeting his or her call center objective is turned on.

The graphical representations may be a game or a race. Different examples of the graphical representations that may be displayed are illustrated in FIGS. 2-5 and discussed above.

At step 608, the method 600 determines whether the graphical representation is completed. For example, if the graphical representation is a pixel art, the method 600 may determine if the entire image is represented by the appropriate pixels on the display. In another embodiment, if the graphical representation is a competition, the method 600 may determine if a team has won the competition. In another embodiment, the graphical representation may be determined to be completed if a timer has expired. In other words, the agents were unable to complete the graphical representation within a pre-defined time period (i.e., the agents are racing against the clock).

If answer to step 608 is no, then the method 600 determines that the graphical representations are not complete and returns to step 604. The method 600 may then repeat steps 604-608 until the graphical representation is completed. If the answer to step 608 is yes, then the method 600 determines that the graphical representations are complete and proceeds to step 630. At step 630, the method 600 ends.

As a result, the embodiments of the present disclosure improve the functioning of an application server or a computer. For example, graphical representation may be generated based on employees of a call center meeting a call center objective by the computer that could not otherwise be generated without the improvements provided by the present disclosure. In other words, the technological art of call center operations are improved by providing a computer that is modified with the ability to generate graphical representations on a display based on employees of a call center meeting a call center objective, as disclosed by the present disclosure.

In addition, the embodiments of the present disclosure provide a transformation. For example, the indication that the agent has met a call center objective is transformed into a signal to turn on a particular pixel within a display that corresponds to the agent.

It should be noted that although not explicitly specified, one or more steps, functions, or operations of the method 600 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 6 that recite a determining operation, or involve a decision, do not necessarily require that both branches of the determining operation be practiced. In other words, one of the branches of the determining operation can be deemed as an optional step.

FIG. 7 depicts a high-level block diagram of a computer that can be transformed to into a machine that is dedicated to perform the functions described herein. Notably, no computer or machine currently exists that performs the functions as described herein. As a result, the embodiments of the present disclosure improve the operation and functioning of the computer to generate a graphical representation to motivate a plurality of employees in a call center, as disclosed herein.

As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 generating a graphical representation to motivate a plurality of employees in a call center, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for generating a graphical representation to motivate a plurality of employees in a call center (e.g., a software program comprising computer-executable instructions) can be loaded into memory 704 and executed by hardware processor element 702 to implement the steps, functions or operations as discussed above in connection with the exemplary method 600. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for generating a graphical representation to motivate a plurality of employees in a call center (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for generating a graphical representation to motivate a plurality of employees in a call center, comprising:
    a display comprising a plurality of pixels, wherein each one pixel of the plurality of pixels represents only one employee and each one of the plurality of pixels represents a different one of the plurality of employees such that there is a one to one correspondence between the plurality of pixels and the plurality of employees;
    a non-transitory computer-readable medium storing the graphical representation; and
    a processor in communication with the display and the non-transitory computer-readable medium, wherein the processor receives an indication from an endpoint device of one of the plurality of employees when the one of the plurality of employees achieves a call center objective and the processor causes a pixel of the plurality of pixels associated with the one of the plurality of employees to turn on in accordance with the graphical representation, wherein the graphical representation comprises a pixel art shape.

2. The apparatus of claim 1, wherein the display is located in the call center and is visible by all of the plurality of employees.

3. The apparatus of claim 1, wherein when the processor receives the indication from each respective endpoint device of each respective one of the plurality of employees and the processor causes each respective one of the plurality of pixels associated with the each respective one of the plurality of employees to turn on in accordance with the graphical representation.

4. The apparatus of claim 1, wherein the call center objective comprises at least one of: a number of positive customer ratings above a ratings threshold, a number of calls completed above a call completion threshold or meeting a target for a Key Performance Indicator.

5. The apparatus of claim 1, wherein the each one of the plurality of pixels represents the one of the plurality of employees randomly.

6. The apparatus of claim 1, wherein the graphical representation comprises a competition between two different teams of the plurality of employees to have each employee of a respective team of the two different teams complete the call center objective to turn on each pixel of a respective pixel art shape of two different pixel art shapes.

7. The apparatus of claim 6, wherein the respective pixel art shape of the respective team that wins is animated to defeat the respective pixel art shape of the respective team that loses.

8. The apparatus of claim 1, wherein the pixel art shape comprises a competition to grow a dot wall past a goal line, wherein the goal line represents an overall call center objective.

9. The apparatus of claim 8, wherein the competition comprises a race between two different teams of the plurality of employees to complete a respective dot wall of two different dot walls past the goal line first.

10. The apparatus of claim 9, wherein the two different dot walls are completed in parallel towards the goal line or opposed to one another towards the goal line.

11. The apparatus of claim 1, wherein the graphical representation comprises a strategic game using the pixel art shape.

12. A method for generating a graphical representation to motivate a plurality of employees in a call center, comprising:
    receiving, by a processor, an indication from an endpoint device of one of the plurality of employees when the one of the plurality of employees achieves a call center objective;
    instructing, by the processor, a display to turn on a pixel of a plurality of pixels associated with the one of the plurality of employees in accordance with the graphical representation, wherein the graphical representation comprises a pixel art shape, wherein each one pixel of the plurality of pixels represents only one employee and each one of the plurality of pixels represents a different one of the plurality of employees such that there is a one to one correspondence between the plurality of pixels and the plurality of employees; and repeating, by the processor, the receiving and the instructing until the graphical representation is completed.

13. The method of claim 12, wherein the call center objective comprises at least one of: a number of positive customer ratings above a ratings threshold, a number of calls completed above a call completion threshold or meeting a target for a Key Performance Indicator.

14. The method of claim 12, wherein the graphical representation comprises a competition between two different teams of the plurality of employees to have each employee of a respective team of the two different teams complete the call center objective to turn on each pixel of a respective pixel art shape of two different pixel art shapes.

15. The method of claim 14, wherein the respective pixel art shape of the respective team that wins is animated to defeat the respective pixel art shape of the respective team that loses.

16. The method of claim 12, wherein the pixel art shape comprises a competition to grow a dot wall past a goal line, wherein the goal line represents an overall call center objective.

17. The method of claim 16, wherein the competition comprises a race between two different teams of the plurality of employees to complete a respective dot wall of two different dot walls past the goal line first, wherein the two different dot walls are completed in parallel towards the goal line or opposed to one another towards the goal line.

18. The method of claim 12, wherein the graphical representation comprises a strategic game using the pixel art shape.

19. A method for generating a graphical representation to motivate a plurality of employees in a call center, comprising:

receiving, by a processor, an indication from an endpoint device that represents a performance of one of the plurality of employees;

determining, by the processor, a color of a pixel to be turned on based on the performance, wherein the color comprises at least one of: a green color indicating that the performance is above a performance range, an orange color indicating the performance is within the performance range or a red color indicating the performance is below the performance range;

instructing, by the processor, a display to turn on the pixel of a plurality of pixels associated with the one of the plurality of employees in accordance with the color based on the performance and the graphical representation, wherein each one pixel of the plurality of pixels represents only one employee and each one of the plurality of pixels represents a different one of the plurality of employees such that there is a one to one correspondence between the plurality of pixels and the plurality of employees; and repeating, by the processor, the receiving, determining and the instructing until the graphical representation is completed.

* * * * *